United States Patent [19]
King

[11] Patent Number: 5,519,458
[45] Date of Patent: May 21, 1996

[54] UNIVERSAL ANTI-GLARE SCREEN APPARATUS

[75] Inventor: Robert King, New York, N.Y.

[73] Assignee: Soft/View Computer Products, New York, N.Y.

[21] Appl. No.: 352,453

[22] Filed: Dec. 9, 1994

[51] Int. Cl.⁶ .................................... H04N 5/72
[52] U.S. Cl. ..................... 348/834; 348/832; 348/835
[58] Field of Search ........................... 348/832, 834, 348/835, 842; 359/601, 609; 248/442.2, 917, 918

[56] References Cited

U.S. PATENT DOCUMENTS

| | | | |
|---|---|---|---|
| 4,354,205 | 10/1982 | Lowe et al. | 348/832 |
| 4,652,085 | 3/1987 | Selling et al. | 348/842 |
| 4,784,468 | 11/1988 | Tierney | 358/252 |
| 4,863,242 | 9/1989 | Correa | 350/276 R |
| 5,004,320 | 4/1991 | Nagai et al. | 350/276 R |
| 5,082,235 | 1/1992 | Crowther et al. | 248/442.2 |
| 5,115,345 | 5/1992 | Hobson et al. | 359/601 |
| 5,121,253 | 6/1992 | Waintroob | 358/252 |
| 5,155,627 | 10/1992 | Keehn et al. | 358/252 |
| 5,233,468 | 8/1993 | McNutty | 348/842 |
| 5,237,453 | 8/1993 | Jones | 348/842 |
| 5,243,463 | 9/1993 | Waintroob | 359/601 |

*Primary Examiner*—Scott A. Rogers
*Assistant Examiner*—Thomas L. Stoll
*Attorney, Agent, or Firm*—Roseman & Colin

[57] ABSTRACT

A universal filter apparatus is described which provides, in a single unit, an anti-glare and/or anti-static screen and frame which is adaptable to monitors of varying sizes. The universal filter apparatus includes a filter screen mounted to a housing. The housing includes a front side, a top side, and at least two lateral sides, each of the at least two lateral sides extending perpendicularly from the front side. A elastically deformable nonresistant securing device is attached to each of the two lateral sides to allow the apparatus to be easily installed on monitors of varying sizes.

7 Claims, 4 Drawing Sheets

UNIVERSAL ANTI-GLARE SCREEN APPARATUS

BACKGROUND OF THE INVENTION

The present invention relates to devices for mounting a frame upon articles of varying sizes. More particularly, the present invention relates to anti-glare and/or anti-static screens which are mountable on or over a video display monitor and corresponding bezel such as that which are a part of a television or computer terminal.

With the widespread use of computer terminals, there is an increasing demand for anti-glare and anti-static devices to reduce either or both the glare and/or static which is reflected off the computer screen. A number of such devices are known in the art. For example, it is known in the art to mount an adhesive strip to the computer monitor and a corresponding adhesive strip to the anti-glare screen frame in order to provide a removable anti-glare screen apparatus. Such a system, however, poses unnecessary complications. For example, it requires that an adhesive material be near permanently mounted to either the computer screen or the surrounding bezel. Moreover, the device is comprised of several components rather than a single unit.

Another drawback of prior art systems is that they fail to eliminate the problems caused by dust and light seepage onto the monitor face negatively affecting the clarity of the image. In its attempt to mold itself to the shapes of various monitor screen and bezel configurations, the above mentioned prior art systems leave gaps between the anti-glare screen and the bezel.

The static electricity generated by the computer screen attracts dust which can enter through these gaps and settle on the monitor screen and on the inside of the anti-glare screen thereby obstructing the user's vision. This requires the user to frequently remove the anti-glare screen in order to clean the dust off of the monitor screen, only to repeatedly weaken the adhesion and affecting both the screen's placement in relationship to the monitor screen and its utility.

Another problem caused by the gap between the anti-glare screen and the bezel is light seepage. Light can enter the gaps between the bezel and the filter screen and reflect back and forth between the monitor and filter screens thereby adding to the glare which reflects off the monitor screen into the eyes of the user.

As a result, there is a need for an apparatus in a single unit which is readily adaptable to monitors of varying sizes, is easily transferable to other monitors of differing sizes, and which eliminates the problem of dust and light seepage.

SUMMARY OF THE INVENTION

The present invention provides a universal filter apparatus which is adaptable to computer monitors of varying sizes. The present invention, unlike some prior art devices, does not require the application of any adhesive substances or mounting brackets to the monitor. Furthermore, it can be installed and removed without dismantling the terminal's bezel. The invention can also be installed and removed quickly without the use of any release mechanism. Moreover, it does not require the manipulation of fixation devices such as adhesive strips, rubber lips, or suction devices.

The present invention includes an anti-glare, anti-static or similar filter screen mounted to a front side of a housing. The housing includes the front side, a top side and at least two lateral sides with the at least two lateral sides protruding substantially perpendicularly from the front side. A securing device is attached to the interior face of each of the lateral sides. In accordance with the present invention, the securing device is composed of rubber, foam rubber, sponge rubber, or a similarly elastically deformable material or device which is sufficiently resilient and nonresistant to allow the housing to easily slide over the monitor. The housing can be installed onto a monitor in a bottom first vertical manner or in a back first horizontal manner.

The elastically deformable and resilient nature of the securing device allows the frame to be mounted onto monitors of varying sizes. Moreover, the nonresistant nature of the securing device allows the frame to be mounted to and removed from the monitor with minimal effort.

As previously mentioned, one problem with anti-glare and anti-static screens is that dust can settle on the monitor screen and on the inside of the filter screen thereby degrading the quality of the picture seen by the user. The apparatus according to the present invention solves this problem because each securing device forms a seal between the apparatus and the side of the monitor. If the securing device extends over substantially all of the length of each of the at least two sides, these seals will prevent dust from settling on the monitor screen and on the inside of the filter screen. Furthermore, the seal prevents light from seeping between the monitor screen and the filter screen. This is important because without the seals, light can enter the gap between the filter screen and the monitor screen and bezel, and reflect back and forth between the monitor screen and filter screen thereby adding to the glare which reflects off the monitor screen into the eyes of the user.

DETAILED DESCRIPTION OF THE DRAWINGS

Figure 1:
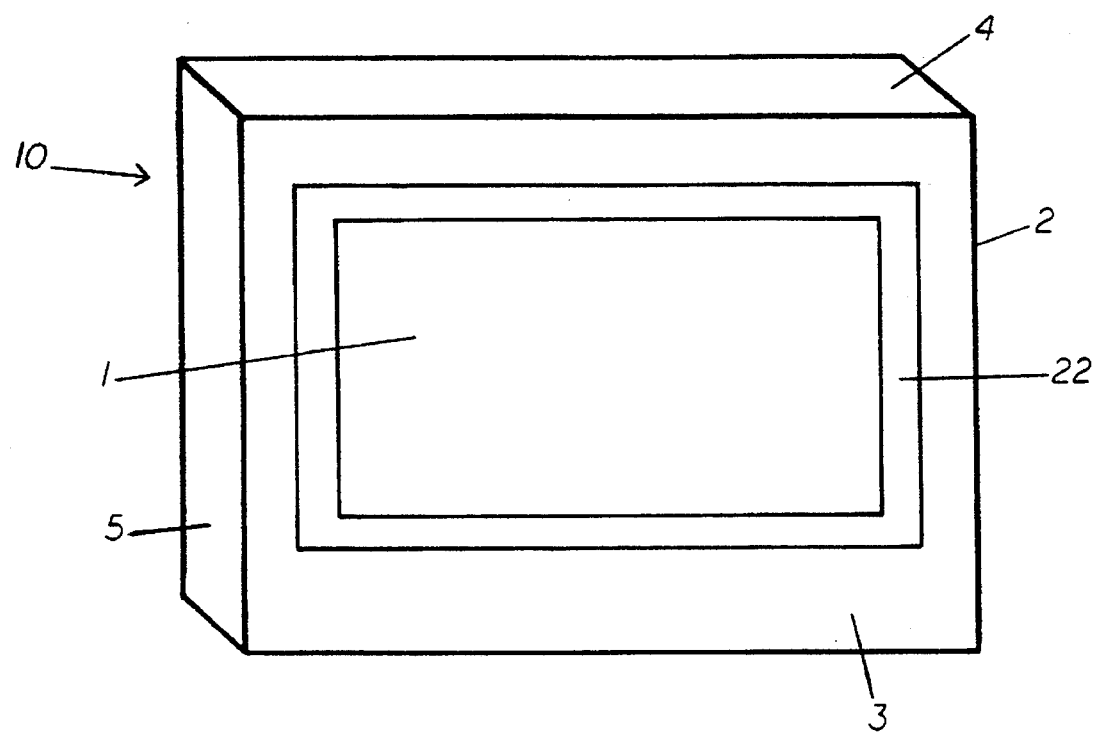
FIG. 1 shows a frontal view of the present invention.

FIGS. 1 and 2, respectively, show a frontal and rear view of the universal filter apparatus according to the present invention. A housing 2 is shown with a front side 3, lateral sides 5, 6, and a top side 4. A filter 1 is mounted to the front side 3 of the housing 2. The top side 4, and lateral sides 5, 6 each extend perpendicularly from the interior face of the front side 3.

Figure 2A:
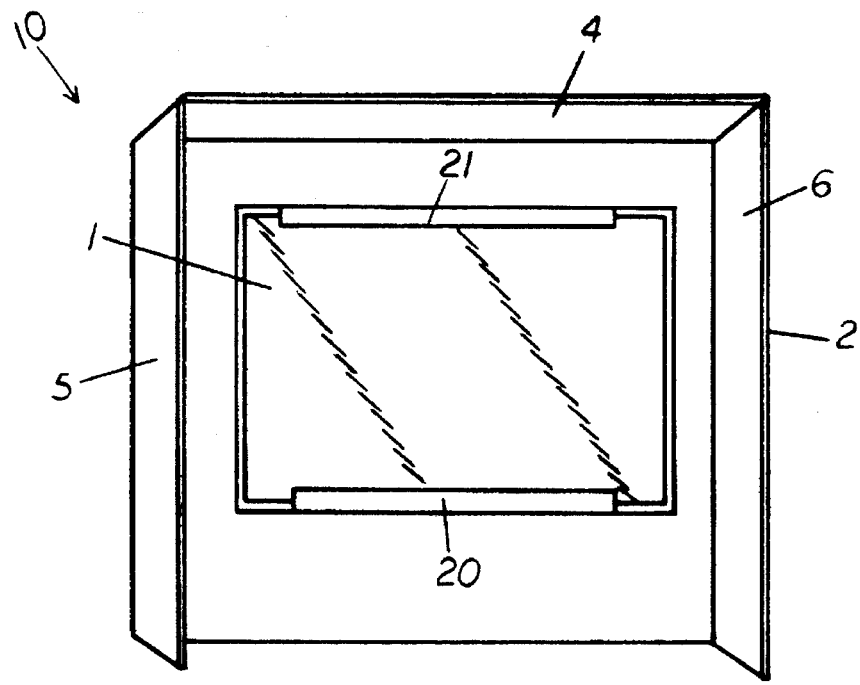
FIG. 2a shows a rear view of the present invention without the securing devices.
Figure 2B:
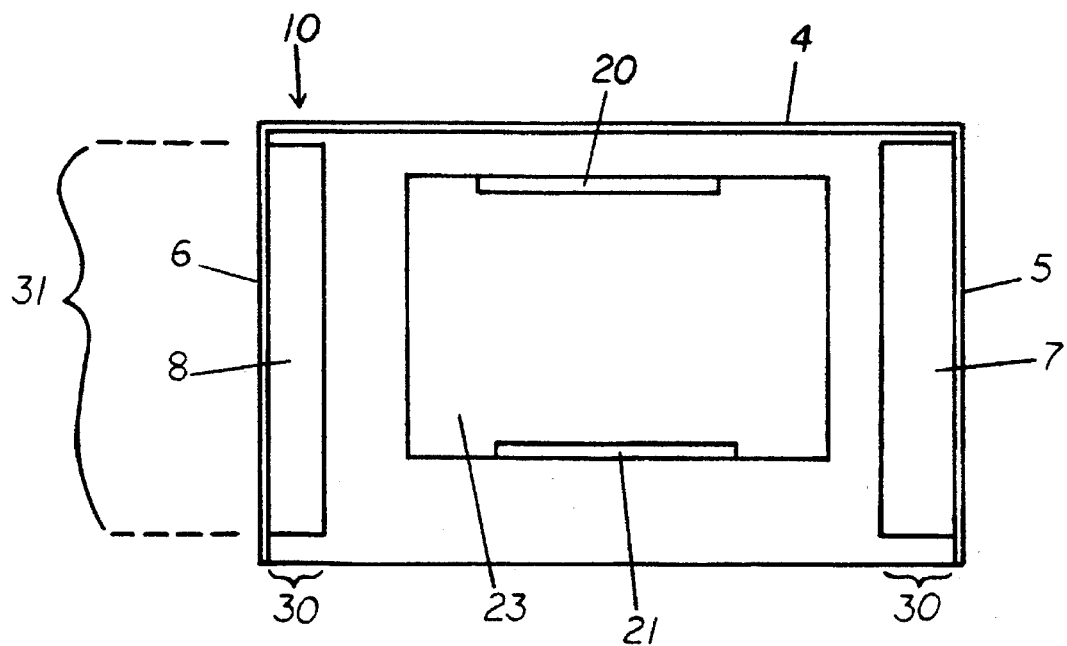
FIG. 2b shows a rear view of the present invention with the securing devices and without a filter.

Securing devices 7 and 8 are attached to the interior face of lateral sides 5 and 6 respectively as illustrated in the rear view of the present invention shown in FIG. 2b (note: the securing devices 7, 8 are omitted from FIG. 2a). The securing devices 7, 8 are composed of foam rubber (e.g. polyester), sponge rubber, or a similar elastically deformable (i.e. resilient) material or device.

The securing device 7, 8 must be sufficiently resilient and nonresistant to allow the housing to slide over the monitor without sticking. The width 30 of the securing device 7, 8, and the elasticity of the material chosen for the securing device 7, 8, dictate the range of monitor sizes which the universal filter apparatus 10 can be adapted to. It should be noted that the width 20 will be limited by the ability of the housing 2 to withstand pressure from a compressed securing device 7, 8 without breaking or experiencing significant deformation.

Figure 3:
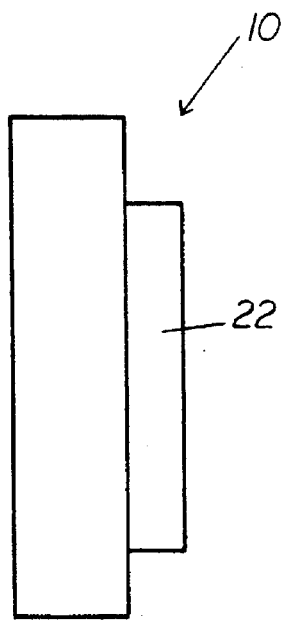
FIG. 3 shows a lateral view of the present invention.

In accordance with an embodiment of the present invention, the housing 2 is comprised of a single piece of molded plastic. The filter 1 can be an anti-glare screen, anti-static screen or similar filter screen. Referring to FIGS. 1–3, the front side 3 of the housing 2 has a raised region 22 with an aperture 23 in which the filter 1 is positioned. The dimensions of the aperture 23 are smaller than the dimensions of the filter 1. The filter 1 is mounted on the interior face of the front side 3 between the raised region 22 and two horizontal lip members 20, 21 which extend from the housing 2 as shown in FIG. 2a.

In an illustrative embodiment according to the present invention, the securing device 7, 8 is comprised of polyester foam and the width 20 of the securing device 7, 8 is ¾". Each securing device has a length 31 substantially equal to the length of the lateral sides 5, 6. The securing device 7, 8 extends over all or most of the lateral sides 5, 6 to form a seal with each side of the monitor 11. This seal, combined with the top side 4 significantly reduces the amount of dust and light which can seep between the universal filter apparatus 10 and the monitor screen.

Figure 4:
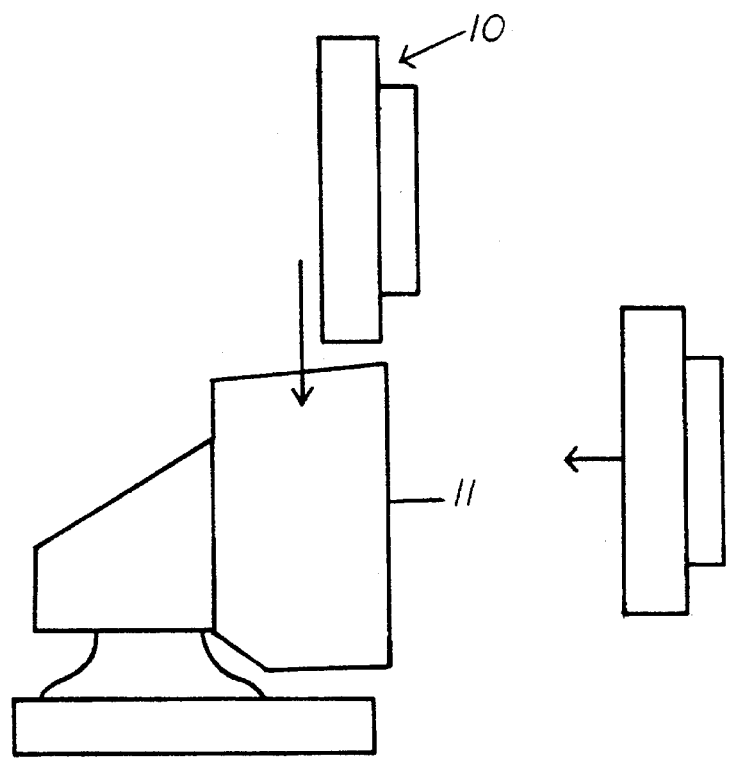
FIG. 4 illustrates the manner in which the present invention is mounted on a monitor.

The manner in which the universal filter apparatus 10 of the present invention is mounted onto a monitor 11 will now be discussed. As shown in FIG. 4, the apparatus according to the present invention is mounted either bottom first onto the monitor 11 in a vertical fashion or back first onto the monitor 11 in a horizontal fashion. As the apparatus 10 slides over the sides of the monitor 11, the securing devices 7, 8 are deformed. Due to the elastically deformable and resilient nature of the securing devices, the compressed securing devices 7, 8 exert pressure upon the monitor 11 and the lateral sides 5, 6 to securely hold the universal filter apparatus 10 in place. Moreover, due to the nonresistant nature of the securing devices, the apparatus can be installed and removed with minimal effort. As explained earlier, the securing devices 7, 8 need not be completely non-adhesive or non-resistent. All that is required is that the substance chosen be sufficiently nonresistant to allow installation and removal of the apparatus 10 which is not impeded or hindered by the friction between the securing devices 7, 8 and the monitor 11.

Figure 5A:
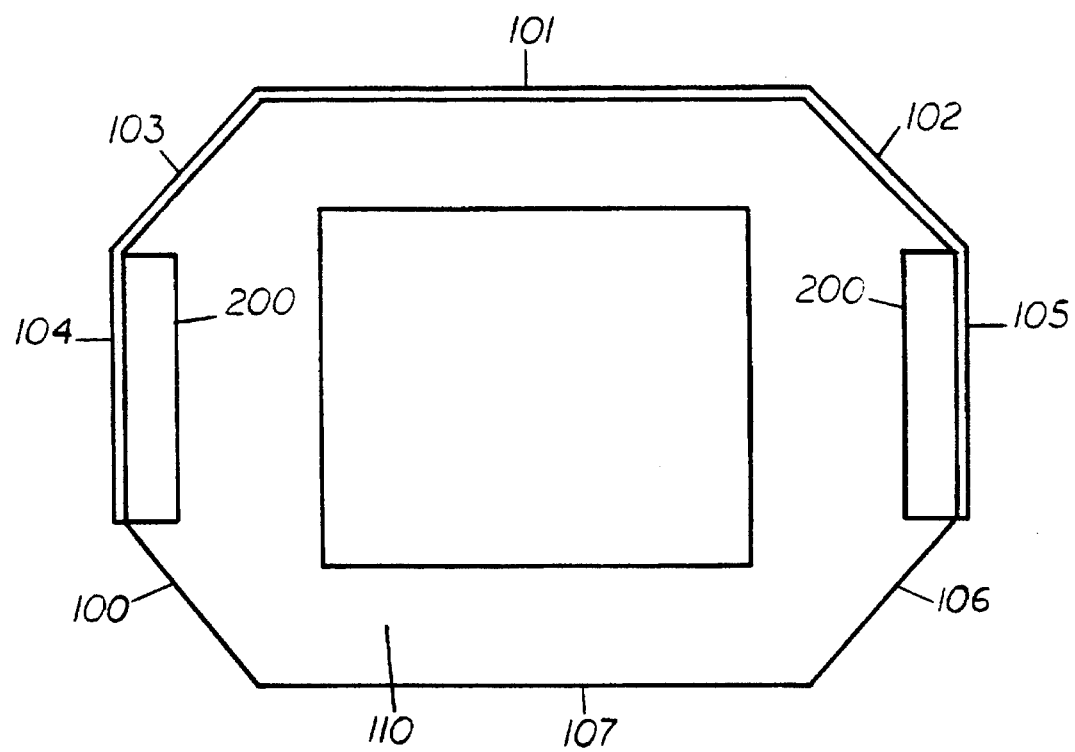
FIGS. 5a, 5b illustrate a further embodiment of the present invention.

The present invention can also be adapted for use with monitors of varying shapes and dimensions. For a monitor face with n sides, securing devices are provided on at least two lateral sides which reside on opposing ends of the apparatus. Taking as a example a monitor face with eight sides, and referring to FIG. 5a, a rear view of an apparatus according to the present invention for use with an octagonal monitor face is shown. A front side 110 is shown with lateral sides 102, 103, 104, 105, 106, 108. In accordance with the present invention, a securing device is provided on the interior face of at least two lateral sides which reside on opposing ends of the apparatus. Thus, a securing device is provided on at least one of sides 103, 104, 108 and on at least one of sides 102, 105, 106. It should be noted that for an n sided monitor, the present invention need only provide three sides: a top side and two lateral sides. Therefore, referring to FIG. 5a, the octagonal apparatus 100 could include the following combinations of sides: (101, 104, 105), (101, 102, 103, 104, 105, 106, 108); (101, 102, 103, 104, 105, 106, 107, 108) etc.

Figure 5B:
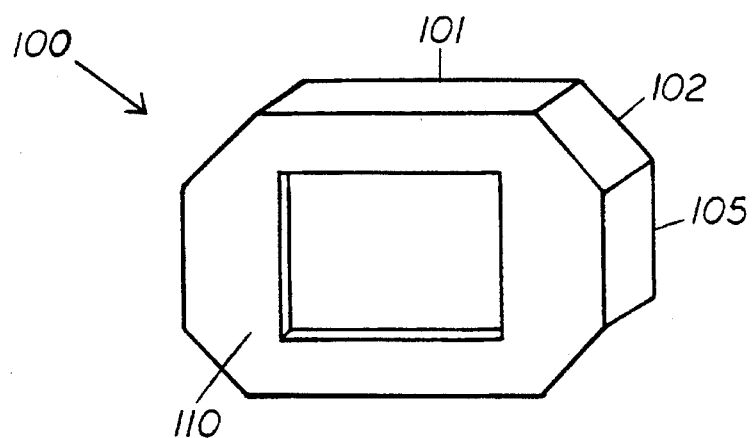

In an exemplary embodiment of the present invention illustrated in FIG. 5b, the octagonal apparatus 100 has a top side 101, and lateral sides 101, 102, 103, 104, 105, each of which extend perpendicularly from the interior face of the front side 110 of the apparatus 100. Securing devices 200 are provided at least on lateral sides 104 and 105. In order to minimize dust and light seepage, however, securing devices 200 should be provided which extend over all or most of the length of each of sides 102, 103, 104, and 105. The octagonal apparatus 100 can be installed and removed from the monitor either in a bottom first, vertical manner or in a back first, horizontal manner.

What is claimed is:

1. A universal filter apparatus, comprising:

(a) a slide-on housing having a front side, a top side, and at least two lateral sides, each of the at least two lateral sides extending substantially perpendicularly from the front side, each of the top side and at least two lateral sides having an interior face and an exterior face;

(b) a filter mounted to the front side of the housing; and (c) an elastically deformable nonresistant securing means for securing the housing to a monitor, the elastically deformable and nonresistant securing means being attached to the interior face of each of the at least two lateral sides, and wherein said elastically deformable nonresistant securing means is adapted to be compressed between the at least two lateral sides, to which it is attached, and the monitor, to exclusively provide said securing.

2. The universal filter apparatus of claim 1, wherein each elastically deformable nonresistant securing means is composed of foam rubber.

3. The universal filter apparatus of claim 1, wherein each elastically deformable nonresistant securing means is composed of sponge rubber.

4. The universal filter apparatus of claim 1, wherein each elastically deformable nonresistant securing means is composed of a non-adhesive rubber.

5. The universal filter apparatus of claim 1, wherein each elastically deformable nonresistant securing means is composed of polyester foam.

6. The universal filter apparatus of claim 1, wherein each elastically deformable nonresistant securing means covers substantially all of the interior face of a respective one of the at least two lateral sides.

7. The universal filter apparatus of claim 1, wherein the top side extends substantially perpendicularly from the front side and the at least two lateral sides is a left lateral side and a right lateral side, each perpendicularly disposed relative to the top side.

* * * * *